(12) United States Patent
Tanii

(10) Patent No.: US 11,623,166 B2
(45) Date of Patent: Apr. 11, 2023

(54) LIQUID PROCESSING APPARATUS AND LIQUID PROCESSING METHOD

(71) Applicant: SUGINO MACHINE LIMITED, Uozu (JP)

(72) Inventor: Akihiro Tanii, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 112 days.

(21) Appl. No.: 17/329,659

(22) Filed: May 25, 2021

(65) Prior Publication Data

US 2021/0402329 A1 Dec. 30, 2021

(30) Foreign Application Priority Data

Jun. 25, 2020 (JP) .............................. JP2020-109331

(51) Int. Cl.
*B01D 17/035* (2006.01)
*B01D 21/00* (2006.01)
(Continued)

(52) U.S. Cl.
CPC ..... *B01D 21/0027* (2013.01); *B01D 17/0205* (2013.01); *B01D 17/0211* (2013.01);
(Continued)

(58) Field of Classification Search
CPC ............ B01D 17/0205; B01D 17/0208; B01D 17/0211; B01D 17/0214; B01D 17/045;
(Continued)

(56) References Cited

U.S. PATENT DOCUMENTS 4,216,085 A * 8/1980 Chittenden .......... B03D 1/1431
210/221.2
4,551,246 A * 11/1985 Coffing ................ B03D 1/1412
210/221.2
(Continued)

FOREIGN PATENT DOCUMENTS

JP 2008-229522 A 10/2008
JP 2015-155092 A 8/2015

OTHER PUBLICATIONS

Machine translation of JP 2008-229522, Oct. 2008 (Year: 2008).*
(Continued)

*Primary Examiner* — Christopher Upton
(74) *Attorney, Agent, or Firm* — United IP Counselors, LLC

(57) ABSTRACT

Provided is a liquid processing apparatus and a liquid processing method for reducing a waste amount of a high specific gravity liquid. The liquid processing apparatus includes: a supply pump; a bubble tank including an inflow port, an overflow port, and a return port; a microbubble generator disposed outside the bubble tank; a recovery tank having a recovery port to recover the processing liquid overflown from a first liquid level to the tank; a separation tank including a settling tank connected to the overflow port, and a floating tank connected to the settling tank at a lower portion, and an ejector having a inlet port connected to the supply pump, a suction port connected the suction body, and a discharge port connected to the return port.

20 Claims, 4 Drawing Sheets

(51) Int. Cl.
   *B01D 21/24*   (2006.01)
   *B01D 21/30*   (2006.01)
   *B01D 17/02*   (2006.01)
   *B03D 1/14*    (2006.01)

(52) U.S. Cl.
   CPC ..... *B01D 17/0214* (2013.01); *B01D 21/0018* (2013.01); *B01D 21/0033* (2013.01); *B01D 21/0066* (2013.01); *B01D 21/2433* (2013.01); *B01D 21/2488* (2013.01); *B01D 21/307* (2013.01); *B03D 1/1412* (2013.01); *B03D 1/1431* (2013.01); *B01D 2221/14* (2013.01)

(58) Field of Classification Search
   CPC .............. B01D 21/2433; B03D 1/1412; B03D 1/1431
   USPC .................................. 210/195.1, 221.2, 703
   See application file for complete search history.

(56) References Cited

U.S. PATENT DOCUMENTS

| | | | |
|---|---|---|---|
| 5,540,836 A * | 7/1996 | Coyne | B01D 17/0205 210/221.2 |
| 2008/0047903 A1* | 2/2008 | Morse | B03D 1/1431 210/703 |
| 2015/0291444 A1* | 10/2015 | Le Quesne | B03D 1/1431 210/703 |
| 2020/0354241 A1* | 11/2020 | Tanii | B01D 17/0205 |

OTHER PUBLICATIONS

Machine translation of JP 2015-155092, Aug. 2015 (Year: 2015).*
Extended European Search Report dated Dec. 1, 2021 in a corresponding European Patent Application No. 21176888.2 (7 pages).

* cited by examiner

LIQUID PROCESSING APPARATUS AND LIQUID PROCESSING METHOD

CROSS-REFERENCE TO RELATED APPLICATIONS

This application claims the benefit of priority to Japanese Patent Application No. 2020-109331, filed on Jun. 25, 2020, the entire contents of which are hereby incorporated by reference.

BACKGROUND

1. Technical Field

The present invention relates to a liquid processing apparatus and a liquid processing method.

2. Description of the Background

A conventional emulsion demulsifying apparatus includes a tank, a microbubble generator installed in the tank, a supply device for supplying a liquid to the microbubble generator, and a gas supply device for supplying a gas such as air to the microbubble generator (Japanese Patent Laid-Open No. 2015-155092). In the conventional emulsion demulsifying apparatus, a microbubble exiting from the microbubble generator demulsify the emulsion in the liquid to separate into at least two kinds of liquids having no mutual affinity, and to float one liquid together with microbubbles.

BRIEF SUMMARY

In the conventional emulsion demulsifying apparatus, a high specific gravity liquid is discarded together with a low specific gravity liquid to be removed.

An object of the present invention is to provide a liquid processing apparatus and a liquid processing method for reducing the amount of waste of a high specific gravity liquid.

A first aspect of the present invention provides a liquid processing apparatus, including:
  a supply pump configured to supply a processing liquid stored in a tank;
  a bubble tank including
    an inflow port,
    an overflow port, and
    a return port;
  a microbubble generator disposed outside the bubble tank and connected to the inflow port, the microbubble generator configured to generate microbubbles by mixing air to a part of the processing liquid supplied from the supply pump;
  a recovery tank connected to the bubble tank at a lower portion, the recovery tank having a recovery port configured to recover the processing liquid overflown from a first liquid level to the tank;
  a separation tank including
    a settling tank connected to the overflow port, the processing liquid and floating matter flowing into the settling tank, and
    a floating tank connected to the settling tank at a lower portion, the floating tank having a suction body disposed at a height of a second liquid level that is lower than the first liquid level; and
  an ejector having
    a first inlet port connected to the supply pump, other part of the processing liquid being supplied to the first inlet port,
    a suction port connected the suction body, and
    a discharge port connected to the return port.

A second aspect of the present invention provides a liquid processing method, including:
  mixing microbubbles of air, outside a bubble tank, into a part of a processing liquid containing floating matter stored in a tank;
  flowing the processing liquid mixed with the microbubbles into the bubble tank;
  floating the microbubbles to be adhered with the floating matter inside the bubble tank;
  flowing the processing liquid into a recovery tank through a lower portion of the bubble tank;
  recovering the processing liquid from the recovery tank to the tank;
  overflowing the processing liquid and the floating matter from an upper portion of a first liquid level of the bubble tank into a settling tank;
  separating the floating matter from the processing liquid by settling or floating inside the settling tank;
  flowing the processing liquid from a lower portion of the settling tank into a floating tank;
  ejecting the other part of the processing liquid stored in the tank inside an ejector;
  discharging the processing liquid sucked from an upper layer portion of the floating tank into the ejector together with the other part of ejected processing liquid to be returned to the bubble tank; and
  draining the floating matter settled inside the settling tank.

The liquid processing apparatus is applied to, for example, a machining apparatus or a cleaning apparatus. The processing liquid is, for example, an aqueous coolant or an aqueous cleaning liquid. The processing liquid is, for example, an aqueous solution in which an extreme pressure lubricant, a caustic alkali, a rust inhibitor, or a preservative is dissolved. The floating matter may be, for example, chips, abrasives, loose burrs, fiber scraps, or oils.

The bubble tank may include a central partition plate disposed vertically, and may be in a U-shape when viewed from above. The central partition plate has a lower end that is in contact with a bottom surface of the bubble tank. The central partition plate has an upper end that protrudes above a first liquid level.

The bubble tank and the recovery tank may integrally constitute a processing tank. The processing tank and the separation tank may be integrally formed.

Preferably, the liquid inflow port is located below the first liquid level and directed downwardly. The return port is located below the first liquid level to face downward. The liquid inflow port and the return port are disposed at a position away from the overflow port when viewed from above, for example, at a diagonal of the overflow port. The liquid inflow port and the return port may be disposed adjacent to each other.

The microbubble generator is, for example, an air shear type. Preferably, the microbubble generator produces bubbles between 20 μm and 50 μm. Preferably, the microbubble generator includes a throttle connected to the air inlet port.

For example, the ejector is installed outside the bubble tank, recovery tank or separation tank. For example, the ejector is installed above or on the side of the separation tank. The ejector ejects the processing liquid supplied from the supply pump, sucks the processing liquid in the floating tank from the suction port, and discharges it to the return port.

The distance from the upper end of the upper partition plate to the liquid level is smaller than the distance from the lower end of the upper partition plate to the bottom surface. The upper end of the upper partition plate is located slightly below the liquid level. The lower end of the upper partition plate is sufficiently above the bottom surface.

The coalescer plate may have a through hole. The two long sides of the coalescer plate are bent downward, for example. The coalescer plate may have a V-shaped or U-shaped cross section. The coalescer plates are vertically arranged at equal intervals, for example. When viewed from above, the coalescer plates adjacent to each other in the vertical direction may be arranged so as to be alternately shifted in the short side direction by overlapping a part of the coalescer plates.

The settling tank may have a second overflow port located above a second liquid level. The second overflow port is connected to the recovery tank. When the processing tank and the separation tank are integrally formed, they may be divided by a separation wall. The overflow port and the second overflow port may be disposed on the separation wall.

The liquid processing apparatus and the liquid processing method of the present invention reduce the amount of waste of the high specific gravity liquid.

DETAILED DESCRIPTION

Figure 1:
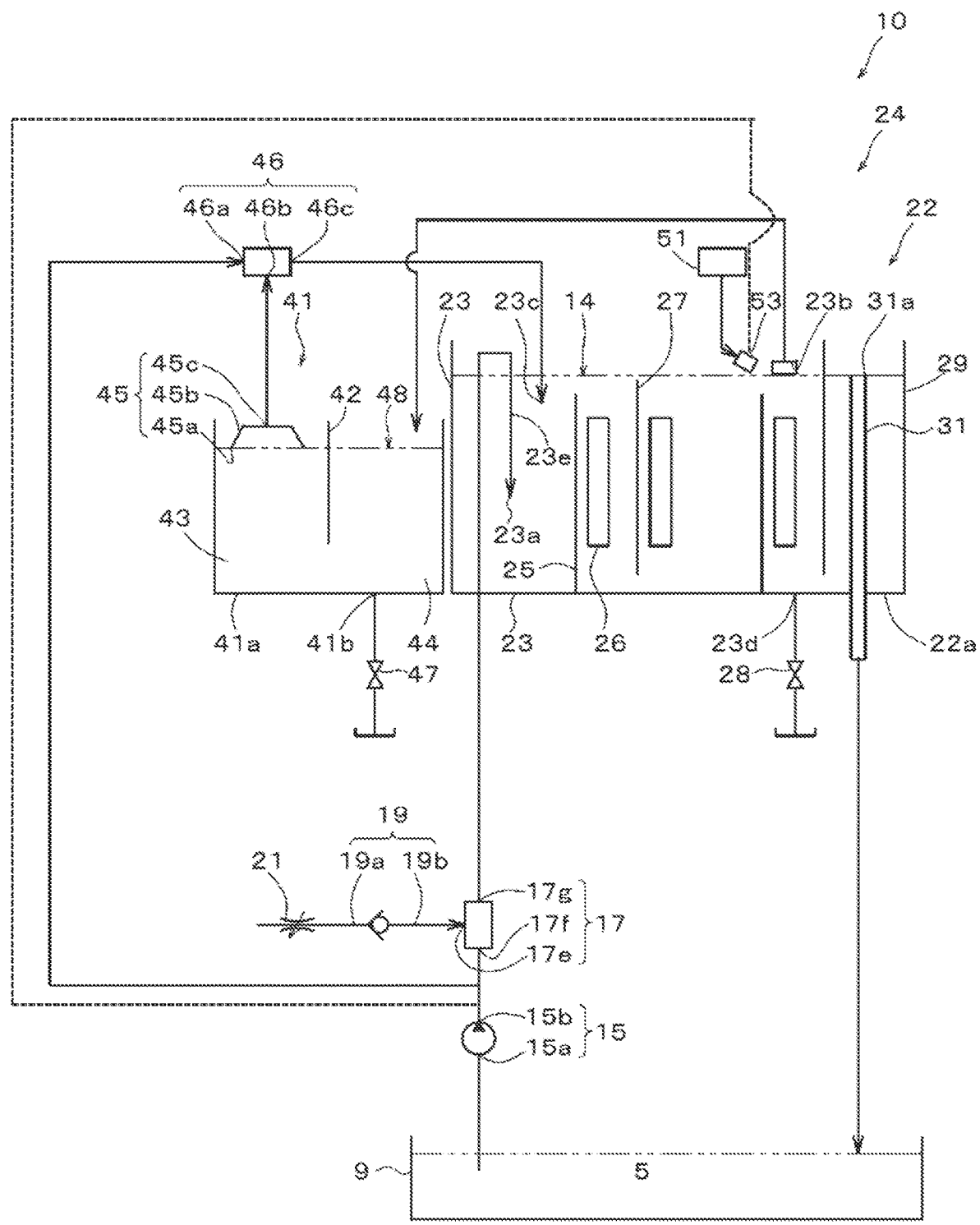
FIG. 1 is a hydraulic circuit diagram of a liquid processing apparatus according to the embodiment.
Figure 2:
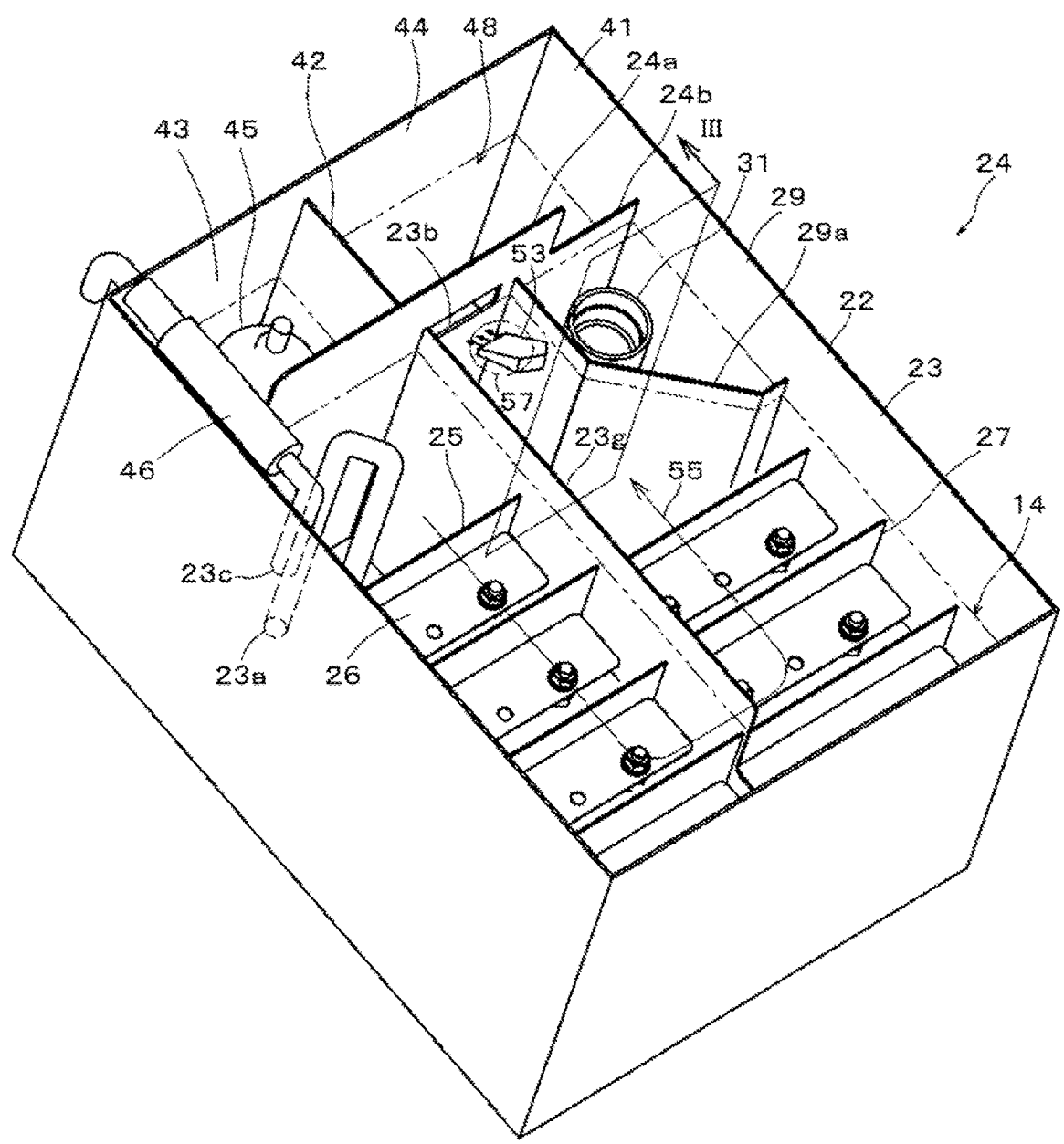
FIG. 2 is a perspective view of the liquid processing apparatus according to the embodiment.

As shown in FIGS. 1 and 2, the liquid processing apparatus 10 includes a processing tank 22, a separation tank 41, a pump (supply pump) 15, a microbubble generator 17, a drain valve (second drain valve) 28, a check valve 19, a suction body 45, an ejector 46, and a drain valve (first drain valve) 47. The processing tank 22 may include a throttle 21, a coalescer 26, an air source 51, and a blow nozzle 53.

The tank 9 stores a processing liquid 5. The processing liquid 5 is, for example, a cleaning liquid in a cleaning machine or a coolant in a processing machine. For example, the processing tank 22 is installed above the tank 9. The liquid processing apparatus 10 separates floating matter from the processing liquid 5.

The processing tank 22 includes a bubble tank 23 and a recovery tank 29. As shown in FIG. 2, for example, the processing tank 22 is configured integrally with the separation tank 41 to form a rectangular parallelepiped tank 24 as a whole. In the vicinity of the short side of the tank 24, a separation wall 24a is installed. The separation wall 24a divides the tank 24 into the separation tank 41 and the processing tank 22. The separation wall 24a forms a part of the wall surface of the recovery tank 29.

The processing tank 22 and the separation tank 41 may be separate.

The recovery tank 29 is disposed at one corner of the processing tank 22 as viewed from above. The recovery tank 29 may have a notch 24b. The recovery tank 29 is separated from the bubble tank 23 by a separation wall 29a having a C-shape or L-shape as viewed from above. The lower part of the separation wall 29a is opened to connect the recovery tank 29 and the bubble tank 23.

Figure 3:
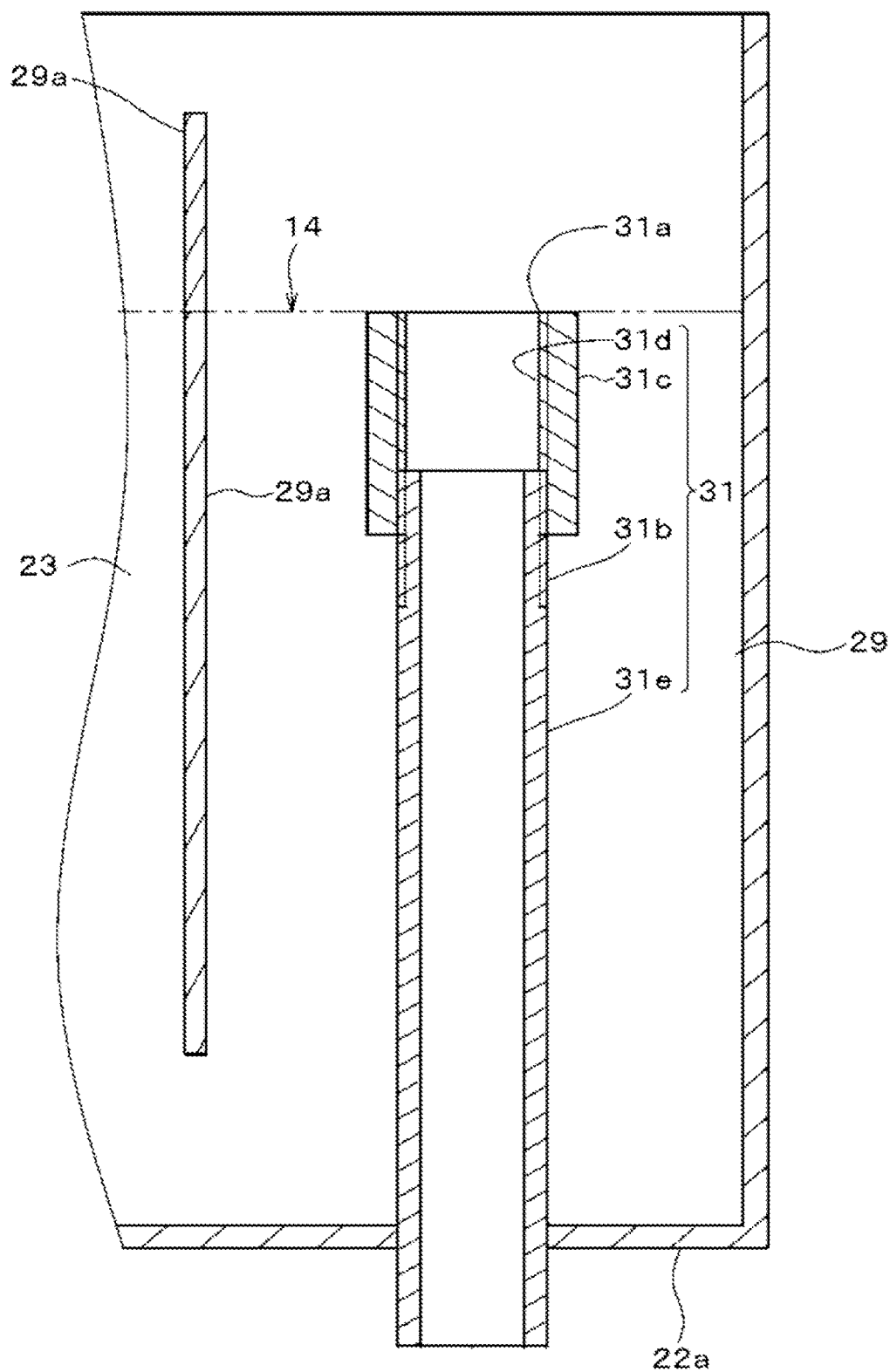
FIG. 3 is a cross-sectional view in plane III of FIG. 2.

A plane III includes a centerline of a recovery pipe 31. As shown in FIG. 3, the recovery pipe 31 is disposed upright in the center of the recovery tank 29. An opening at the top of the recovery pipe 31 serves as a recovery port 31a. The processing liquid 5 flowing into the processing tank 22 overflows to the recovery port 31a and returns to the tank 9. The height of the liquid level (first liquid level) 14 of the processing liquid 5 is determined by the height of the recovery port 31a.

The recovery pipe 31 may include a fixed pipe 31e, an external thread 31b, and an adjustment pipe 31c. The fixed pipe 31e is disposed upright from a bottom surface 22a. The external thread 31b is provided at the upper end portion of the fixed pipe 31e. The adjustment pipe 31c has an internal thread 31d on its inner surface. The adjustment pipe 31c is screwed into the external thread 31b. The recovery pipe 31 is connected to the tank 9. The screwing amount of the adjustment pipe 31c adjusts the height of the liquid level 14.

The notch (second overflow port) 24b is disposed near the upper end of the separation wall 24a. The height of the notch 24b is higher than the liquid level 14, and lower than the separation wall 29a. The lower end of the notch 24b is higher than the lower end of the overflow port 23b. The notch 24b allows the air bubbles and the floating matter to flow into the recovery tank 29 when the height of the air bubbles and the floating matter above a liquid level 48 rises excessively.

As shown in FIG. 2, the portion of the processing tank 22 other than the recovery tank 29 is the bubble tank 23. The bubble tank 23 includes a central partition plate 23g, an upper partition plate 27, a lower partition plate 25, an inflow port 23a, an overflow port 23b, a return port 23c, and a drain port (second drain port) 23d.

The central partition plate 23g extends along the long side direction in the center of the short side direction of the processing tank 22. In the vertical direction, the central partition plate 23g extends from the bottom surface 22a to above the liquid level 14. At the opposite end to the separation wall 24a, the upper portion of the central partition plate 23g is cut out to below the liquid level 14. The bubble tank 23 is partitioned by the central partition plate 23g to form a U-shaped path 55 as viewed from above. The central partition plate 23g achieves the same effect as the lower partition plate 25.

The inflow port 23a is disposed at the end of the processing tank 22 opposite to the recovery tank 29. The inflow port 23a is disposed below the liquid level 14 and below the middle of the depth of the processing tank 22. A tube 23e connected to the inflow port 23a rises from the bottom surface 22a of the tank 24 to above the liquid level 14, and extends downward from the liquid level 14 to open downward. The opening of the tube 23e is the inflow port 23a. As the inflow port 23a is disposed in the liquid, the liquid level 14 is hardly bubbled.

The return port 23c is disposed below the liquid level in the vicinity of the inflow port 23a. As the return port 23c is disposed in the liquid, the liquid level 14 is hardly bubbled.

The upper partition plate 27 is erected inside the bubble tank 23 with a gap from the bottom surface 22a. The upper partition plate 27 is parallel to the separation wall 24a. The upper partition plate 27 has an upper end that is slightly lower than the recovery port 31*a*. The upper partition plate 27 extends slightly (for example 2 to 3 mm) below the liquid level 14.

The lower partition plate 25, which is in contact with the bottom surface 22*a*, stands on the bubble tank 23. The lower partition plate 25 is disposed in parallel with the separation wall 24*a* between the separation wall 24*a* and the upper partition plate 27. The lower partition plate 25 has an upper end that is lower than the recovery port 31*a*. The upper end of the lower partition plate 25 is located below the liquid level 14.

One or more upper partition plates 27 and one or more lower partition plates 25 may be disposed. For example, only one lower partition plate 25 may be disposed. The upper partition plate 27 and the lower partition plate 25 are alternately disposed.

As the upper partition plate 27 and the lower partition plate 25 are alternately arranged, the processing liquid 5 repeatedly ascends and descends when passing inside the bubble tank 23. The separation of the floating matter inside the processing liquid 5 is thus promoted. Further, as the upper partition plate 27 is located slightly below the liquid level 14, bubbles and floating matter on the liquid level 14 move toward the overflow port 23*b* on the liquid level 14. Then, the air bubbles and the floating matter on the liquid level 14 flow into the separation tank 41 through the overflow port 23*b*.

The overflow port 23*b* is disposed in the separation wall 24*a* near the recovery tank 29. The overflow port 23*b*, which has a rectangular shape, has a lower end that is disposed slightly above the liquid level 14.

The drain port 23*d* is disposed on the bottom surface 22*a*. For example, the drain port 23*d* is disposed at an end of the bubble tank 23 close to the overflow port 23*b*. The drain valve 28 is connected to the drain port 23*d*.

Figure 4:
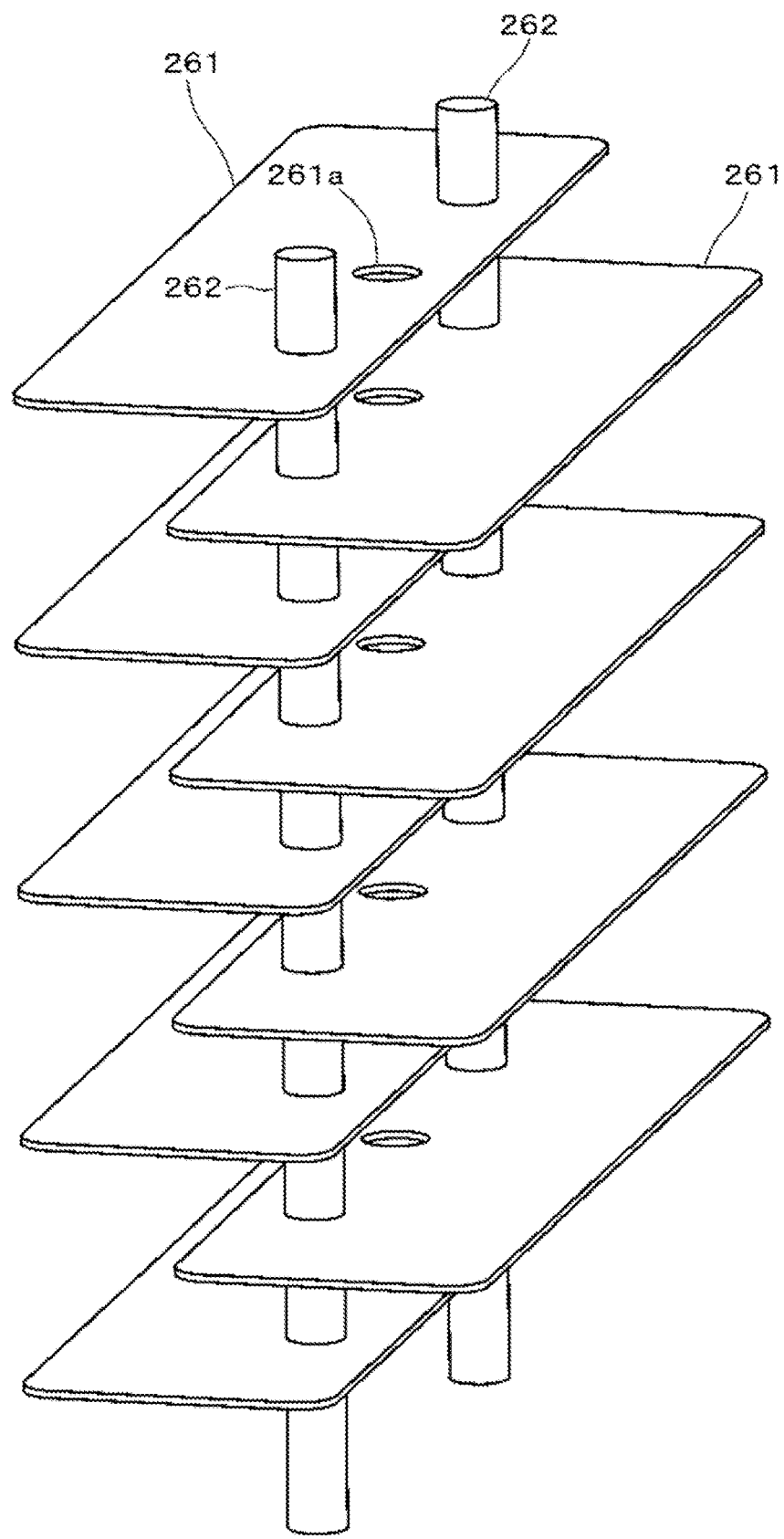
FIG. 4 is a perspective view of a coalescer according to the embodiment.

The coalescer 26 is disposed along the separation wall 24*a*, the upper partition plate 27, and the lower partition plate 25. As shown in FIG. 4, the coalescer 26 includes a plurality of coalescer plates 261 and a plurality of connecting rods 262. The coalescer plate 261 has a through hole 261*a*. The coalescer plates 261 are arranged at equal intervals in the vertical direction. The coalescer plates 261 vertically adjacent to each other are arranged by shifting alternately in the short side direction with a part of the coalescer plate 261 overlapping as viewed from above. The connecting rod 262 connects the plurality of coalescer plates 261.

The pump 15 has a liquid supply port 15*a* and a discharge port 15*b*. The pump 15 is, for example, a volute pump, or a pneumatically driven diaphragm pump. The pump 15 may be disposed in the tank 9. The discharge port 15*b* is connected to the inflow port 23*a* through a microbubble generator 17. The liquid supply port 15*a* is connected to the tank 9.

The microbubble generator 17 is a rotational flow type microbubble generator. The microbubble generator 17 has an air inlet port 17*e*, a processing liquid inlet port 17*f*, and an outlet port (second outlet port) 17*g*. Preferably, the air inlet port 17*e* is connected to the outside air through the check valve 19 and the throttle 21. The check valve 19 has an inlet port (second inlet port) 19*a* and an outlet port (first outlet port) 19*b*. The inlet port 19*a* is connected to the throttle 21. The outlet port 19*b* is connected to the air inlet port 17*e*. The check valve 19 prevents the processing liquid from being discharged from the air inlet port 17*e* to the outside air. The processing liquid inlet port 17*f* is connected to the discharge port 15*b*. The outlet port 17*g* is connected to the inflow port 23*a*.

The air source 51 is, for example, a compressed air supply port, a blower port, a fan, a compressor, or a blower. When the pump 15 is a pneumatically driven diaphragm pump, the air source 51 is preferably the exhaust port of the diaphragm pump.

The discharge port 15*b* of the liquid supply pump 15 may be connected to a blow nozzle 53 described later. In this case, the discharge port 15*b* of the liquid supply pump 15 serves as the air source 51.

The blow nozzle 53 is, for example, a flat nozzle, or a slit nozzle. The blow nozzle 53, which is disposed near the overflow port 23*b* and above the liquid level 14, ejects air obliquely downward toward the overflow port 23*b*.

The separation tank 41 includes a settling tank 44, a floating tank 43, a bottom surface 41*a*, and a drain port (first drain port) 41*b*. The settling tank 44 and the floating tank 43 are divided by the separation wall 42 from above the liquid level 48 to the vicinity of the bottom surface 41*a*. The settling tank 44 and the floating tank 43 are connected at the bottom. The overflow port 23*b* is connected to the settling tank 44. The bottom surface 41*a* is integral with the bottom surface 22*a*.

The drain port 41*b* is disposed on the bottom surface 41*a*. The drain port 41*b* is disposed in the floating tank 43 or the settling tank 44. The drain port 41*b* of the present embodiment is disposed in the settling tank 44. This suppresses contamination of the floating tank 43. The drain valve 47 is connected to the drain port 41*b*.

The suction body 45 is disposed above the floating tank 43. The suction body 45 includes an inlet port 45*a*, a cup 45*b*, and an outlet port (third outlet port) 45*c*. The inlet port 45*a* is disposed at a lower end portion of the suction body 45. The inlet port 45*a* is, for example, a circular shape having a large diameter. The outlet port 45*c* is disposed at an upper end portion of the suction body 45. The outlet port 45*c* is, for example, a circular shape having a small diameter. The cup 45*b* connects the inlet port 45*a* and the outlet port 45*c* with a gentle curved surface. The height of the inlet port 45*a* defines the height of the liquid level (second liquid level) 48. The liquid level 48 is lower than the liquid level 14.

The ejector 46 is a known ejector. The ejector 46 has an inlet port (first inlet port) 46*a*, a suction port 46*b*, and a discharge port 46*c*. The inlet port 46*a* is connected to the discharge port 15*b*. The suction port 46*b* is connected to the outlet port 45*c*. The discharge port 46*c* is connected to the return port 23*c*.

Referring primarily to FIG. 1, a method of processing the processing liquid 5 will be described.

The processing liquid 5 stored in the tank 9 is supplied by the pump 15, most of which is supplied to the microbubble generator 17. The microbubble generator 17 mixes air flowing through the check valve 19 into the processing liquid 5 as microbubbles.

The processing liquid 5 mixed with the microbubbles flows into the bubble tank 23 from the inflow port 23*a*. The processing liquid 5 flows along a path 55 (see FIG. 2) toward the overflow port 23*b* while passing through the upper partition plate 27 and the lower partition plate 25. During this time, microbubbles in the processing liquid 5 adhere to the floating matter contained in the processing liquid 5 to rise in the processing liquid 5. The microbubbles are tied together and their rising velocity increases as the bubbles grow. As the processing liquid 5 flows along the U-shaped path 55, the moving length of the processing liquid 5 becomes long, and bubbles tend to increase.

The processing liquid 5 passes through the coalescer 26. At this time, the coalescer plate 261 and the through holes 261a disturb the flow of the processing liquid 5 to promote the contact of microbubbles and the growth of the bubbles.

The air flow ejected from the blow nozzle 53 feeds the liquid level 14 in the vicinity 57 of the overflow port 23b (see FIG. 2). The air blowing promotes the floating matter on the liquid level 14 in the vicinity 57 of the overflow port 23b to flow into the overflow port 23b.

The processing liquid 5 in the lower portion of the bubble tank 23 flows into the recovery tank 29 through the lower portion of the separation wall 29a. The processing liquid 5 rises up the recovery tank 29, flows into the recovery pipe 31 through the recovery port 31a, and is recovered into the tank 9.

The air bubbles containing the floating matter in the upper layer portion of the air bubble tank 23 overflow into the separation tank 41 through the overflow port 23b together with the processing liquid 5 in the upper layer portion. The processing liquid 5 temporarily descends in the settling tank 44, and flows into the floating tank 43 from the lower portion of the settling tank 44.

The processing liquid 5 includes a floating matter having a specific gravity larger than that of the processing liquid 5 (e.g., metal powder or polishing powder) or a floating matter having a specific gravity smaller than that of the processing liquid 5 (e.g., an oil content). The floating matter having a large specific gravity settles in the settling tank 44. When the processing liquid 5 descends in the settling tank 44, sedimentation of the floating matter having a large specific gravity in the processing liquid is promoted. On the other hand, the floating matter having a small specific gravity rises in the settling tank 44 to float on the liquid level 48. The processing liquid 5 from which the floating matter is separated rises in the floating tank 43 to be sucked from the suction body 45.

The amount of liquid flowing into the separation tank 41 is sufficiently smaller than the discharge amount of the pump 15. Even when the separation tank 41 is smaller volume than the bubble tank 23, the residence time of the processing liquid 5 in the separation tank 41 can be sufficiently long compared with the residence time in the bubble tank 23. Therefore, the separation of the floating matter due to the difference in specific gravity in the separation tank 41 easily progresses as compared with the bubble tank 23. The floating matter contained in the processing liquid 5 is concentrated in the separation tank 41.

The pump 15 partially supply the processing liquid to the ejector 46. The ejector 46 ejects the processing liquid 5 supplied from the pump 15 inside the ejector 46 to suck the processing liquid 5 separated in the upper portion of the floating tank 43 through the suction body 45 by a negative pressure generated by the ejection of the processing liquid 5. Then, the ejector 46 discharges the ejected processing liquid 5 and the processing liquid 5 sucked from the suction body 45 together through the discharge port 46c to return the processing liquid 5 to the processing tank 22 through the return port 23c. The processing liquid 5 from which the floating matter is removed in the separation tank 41 is supplied again to the bubble tank 23 to come into contact with the microbubbles.

The drain valve 47 is periodically opened by the operator to discharge the processing liquid 5 staying in the separation tank 41 and the entire amount of the floating matter. Preferably, the inside of the separation tank 41 is cleaned at this time. The drain valve 47 is opened, for example, once a week.

The floating matter having a large specific gravity may settle in the processing tank 22. The drain valve 28 is periodically opened by the operator to discharge the floating matter staying in the processing tank 22 and the entire amount of the processing liquid. Preferably, the inside of the processing tank 22 is cleaned at this time. The drain valve 28 is opened, for example, once every six months.

According to the embodiment, the floating matter in the processing tank 22 overflows into the separation tank 41 and is separated in the separation tank 41 to clean the processing liquid 5. The processing liquid 5 cleaned in the separation tank 41 is again processed in the processing tank 22. The floating matter is concentrated in the separation tank 41, and the processing liquid 5 is not always discharged from the liquid processing apparatus 10. The floating matter contained in the processing liquid 5 is concentrated in the separation tank 41. By periodically draining the separation tank 41, the floating matter contained in the processing liquid 5 is condensed to be discarded.

EXAMPLES

An aqueous cleaning liquid for a high-pressure cleaning apparatus was processed using a rotational flow type microbubble generator with a processing tank having a volume of 25 L, a separation tank having a volume of 5 L, and a flow rate of 10 L/min. After the liquid processing apparatus 10 was operated for one week, the processing liquid 5 at each portion of the liquid processing apparatus 10 was collected to measure the amount of solid matter in the collected processing liquid 5. The collected processing liquid 5 was filtered under reduced pressure, and the oil content remaining on the filter paper was cleaned with an organic solvent. After drying the cleaned filter paper, the mass of solid matter remaining on the filter paper was measured.

The measurement results are shown in Table 1.

TABLE 1

| No. | Collected Location | Amount of Solid Matter (mg/100 mL) |
| --- | --- | --- |
| 1 | Overflow port 23b | 1.45 |
| 2 | Bottom of Settling Tank 44 | 35.6 |
| 3 | Near Liquid Level of Floating Tank 43 | 0.70 |
| 4 | Recovery Port 31a | 0.37 |

The amount of solid matter flowing from the overflow port 23b into the separation tank 41 per 100 mL is 1.45 mg, whereas it is 35.6 mg at the bottom of the settling tank 44, which is concentrated 24.5 times. On the other hand, the processing liquid 5 returned from near the liquid level of the floating tank 43 to the bubble tank 23 was cleaned to 0.70 mg, which is 0.48 times. Then, the amount of solid matter collected from the recovery tank 29 was cleaned to 0.37 mg, which is 0.25 times compared to the processing liquid 5 flowing out from the overflow port 23b. The liquid processing apparatus 10 effectively normalizes the processing liquid 5.

It should be noted that the present invention is not limited to the embodiments described above, and various modifications can be made without departing from the gist of the present invention, and all technical matters included in the technical idea described in the claims are the subject matter of the present invention. While the foregoing embodiments illustrate preferred examples, those skilled in the art will appreciate that various alternatives, modifications, variations, or improvements may be made in light of the teachings disclosed herein and are within the scope of the appended claims.

REFERENCE SIGNS LIST

5 Processing liquid
9 Tank
14 Liquid level (First liquid level)
15 Supply pump
17 Microbubble generator
23 Bubble tank
23a Inflow port (processing liquid inflow)
23b Overflow port
23c Return port
29 Recovery tank
31a Recovery port
43 Floating tank
44 Settling tank
45 Suction body
46 Ejector

What is claimed is:

1. A liquid processing apparatus, comprising:
a supply pump configured to supply a processing liquid stored in a tank;
a bubble tank including
an inflow port,
an overflow port, and
a return port;
a microbubble generator disposed outside the bubble tank and connected to the inflow port, the microbubble generator configured to generate microbubbles by mixing air to a part of the processing liquid supplied from the supply pump;
a recovery tank connected to the bubble tank at a lower portion, the recovery tank having a recovery port configured to recover the processing liquid overflown from a first liquid level to the tank;
a separation tank including
a settling tank connected to the overflow port, the processing liquid and floating matter flowing into the settling tank, and
a floating tank connected to the settling tank at a lower portion, the floating tank having a suction body disposed at a height of a second liquid level that is lower than the first liquid level; and
an ejector having
a first inlet port connected to the supply pump, other part of the processing liquid being supplied to the first inlet port,
a suction port connected the suction body, and
a discharge port connected to the return port.

2. The liquid processing apparatus according to claim 1, further comprising:
a check valve including
a second inlet port that is open to the outside air, and
a first outlet port;
wherein the microbubble generator includes
a processing liquid inlet port connected to the supply pump,
an air inlet port connected to the first outlet port, and
a second outlet port connected to the air inlet port and the inflow port.

3. The liquid processing apparatus according to claim 2, further comprising:
a first drain port disposed at a lower portion of the separation tank; and
a first drain valve connected to the first drain port.

4. The liquid processing apparatus according to claim 2, further comprising:
a second drain port disposed at a lower portion of the bubble tank; and
a second drain valve connected to the second drain port.

5. The liquid processing apparatus according to claim 2, further comprising:
a lower partition plate disposed in the bubble tank, the lower partition plate having a lower end that is contact with a bottom surface of the bubble tank, and an upper end located below the first liquid level near the first liquid level; and
an upper partition plate disposed in the bubble tank, the upper partition plate having an upper end located below the first liquid level near the first liquid level, and a lower end located above the bottom surface near the bottom surface.

6. The liquid processing apparatus according to claim 2, further comprising:
a coalescer disposed in the bubble tank, the coalescer including a plurality of coalescer plates each extending horizontally, the plurality of coalescer plates spaced apart from each other in a vertical direction.

7. The liquid processing apparatus according to claim 1, further comprising:
a first drain port disposed at a lower portion of the separation tank; and
a first drain valve connected to the first drain port.

8. The liquid processing apparatus according to claim 7, further comprising:
a second drain port disposed at a lower portion of the bubble tank; and
a second drain valve connected to the second drain port.

9. The liquid processing apparatus according to claim 7, further comprising:
a lower partition plate disposed in the bubble tank, the lower partition plate having a lower end that is contact with a bottom surface of the bubble tank, and an upper end located below the first liquid level near the first liquid level; and
an upper partition plate disposed in the bubble tank, the upper partition plate having an upper end located below the first liquid level near the first liquid level, and a lower end located above the bottom surface near the bottom surface.

10. The liquid processing apparatus according to claim 7, further comprising:
a coalescer disposed in the bubble tank, the coalescer including a plurality of coalescer plates each extending horizontally, the plurality of coalescer plates spaced apart from each other in a vertical direction.

11. The liquid processing apparatus according to claim 1, further comprising:
a second drain port disposed at a lower portion of the bubble tank; and
a second drain valve connected to the second drain port.

12. The liquid processing apparatus according to claim 11, further comprising:
a lower partition plate disposed in the bubble tank, the lower partition plate having a lower end that is contact with a bottom surface of the bubble tank, and an upper end located below the first liquid level near the first liquid level; and an upper partition plate disposed in the bubble tank, the upper partition plate having an upper end located below the first liquid level near the first liquid level, and a lower end located above the bottom surface near the bottom surface.

13. The liquid processing apparatus according to claim 11, further comprising:

a coalescer disposed in the bubble tank, the coalescer including a plurality of coalescer plates each extending horizontally, the plurality of coalescer plates spaced apart from each other in a vertical direction.

14. The liquid processing apparatus according to claim 1, further comprising:

a lower partition plate disposed in the bubble tank, the lower partition plate having a lower end that is contact with a bottom surface of the bubble tank, and an upper end located below the first liquid level near the first liquid level; and an upper partition plate disposed in the bubble tank, the upper partition plate having an upper end located below the first liquid level near the first liquid level, and a lower end located above the bottom surface near the bottom surface.

15. The liquid processing apparatus according to claim 1, further comprising:

a coalescer disposed in the bubble tank, the coalescer including a plurality of coalescer plates each extending horizontally, the plurality of coalescer plates spaced apart from each other in a vertical direction.

16. The liquid processing apparatus according to claim 1, wherein the suction body includes
a cup facing downward, and
a third outlet port disposed at an upper end of the cup.

17. The liquid processing apparatus according to claim 1, further comprising:

an air source; and
a blow nozzle connected to the air source, the blow nozzle disposed above the first liquid level toward the overflow port, the blow nozzle configured to blow the floating matter into the overflow port.

18. The liquid processing apparatus according to claim 17, wherein the supply pump is a compressed air drive pump including
a compressed air supply port, and
an exhaust port,
wherein the blow nozzle is connected to the exhaust port.

19. A liquid processing method, comprising:

mixing microbubbles of air, outside a bubble tank, into a part of a processing liquid containing floating matter stored in a tank;

flowing the processing liquid mixed with the microbubbles into the bubble tank;

floating the microbubbles to be adhered with the floating matter inside the bubble tank;

flowing the processing liquid into a recovery tank through a lower portion of the bubble tank;

recovering the processing liquid from the recovery tank to the tank;

overflowing the processing liquid and the floating matter from an upper portion of a first liquid level of the bubble tank into a settling tank;

separating the floating matter from the processing liquid by settling or floating inside the settling tank;

flowing the processing liquid from a lower portion of the settling tank into a floating tank;

ejecting the other part of the processing liquid stored in the tank inside an ejector;

discharging the processing liquid sucked from an upper layer portion of the floating tank into the ejector together with the other part of ejected processing liquid to be returned to the bubble tank; and draining the floating matter settled inside the settling tank.

20. The liquid processing method according to claim 19, wherein the floating matter adhered with the microbubbles are contact to be coupled with a coalescer plate.

* * * * *